SUPERCHARGER ARRANGEMENT

Filed June 17, 1948 13 Sheets-Sheet 1

Inventors
Gilmoure N. Cole
John S. Hasbrouck
by Charles A. Warren
Attorney

Sept. 29, 1953 G. N. COLE ET AL 2,653,591

SUPERCHARGER ARRANGEMENT

Filed June 17, 1948 13 Sheets-Sheet 2

Inventors
Gilmoure N. Cole
John S. Hasbrouck
by Charles A. Warren
Attorney

Inventors
Gilmoure N. Cole
John S. Hasbrouck
By Charles A. Warren
Attorney

Inventors
Gilmoure N. Cole
John S. Hasbrouck
by Charles A. Warren
Attorney

Sept. 29, 1953 G. N. COLE ET AL 2,653,591

SUPERCHARGER ARRANGEMENT

Filed June 17, 1948 13 Sheets-Sheet 5

Inventors
Gilmoure N. Cole
John S. Hasbrouck
by Charles A. Warren
Attorney

Inventors
Gilmoure N. Cole
John S. Hasbrouck
by Charles A. Warren
Attorney

Sept. 29, 1953 G. N. COLE ET AL 2,653,591

SUPERCHARGER ARRANGEMENT

Filed June 17, 1948 13 Sheets-Sheet 7

Inventors
Gilmoure N. Cole
John S. Hasbrouck
by Charles A. Warren
Attorney

Sept. 29, 1953 G. N. COLE ET AL 2,653,591

SUPERCHARGER ARRANGEMENT

Filed June 17, 1948 13 Sheets-Sheet 8

Inventors
Gilmoure N. Cole
John S. Hasbrouck
by Charles A. Warren
Attorney

Inventors
Gilmoure N. Cole
John S. Hasbrouck
by [illegible]
Attorney

Inventors
Gilmoure N. Cole
John S. Hasbrouck
by Charles A. Warren
Attorney

Sept. 29, 1953 G. N. COLE ET AL 2,653,591

SUPERCHARGER ARRANGEMENT

Filed June 17, 1948 13 Sheets-Sheet 11

Inventors
Gilmoure N. Cole
John S. Hasbrouck
by Charles A. Warren
Attorney

Inventors
Gilmoure N. Cole
John S. Hasbrouck
by Charles A. Warren
Attorney

Sept. 29, 1953 G. N. COLE ET AL 2,653,591

SUPERCHARGER ARRANGEMENT

Filed June 17, 1948 13 Sheets-Sheet 13

Inventors
Gilmoure N. Cole
John S. Hasbrouck
by Charles A. Warren
Attorney

Patented Sept. 29, 1953

2,653,591

UNITED STATES PATENT OFFICE 2,653,591

SUPERCHARGER ARRANGEMENT

Gilmoure N. Cole, Manchester, and John S. Hasbrouck, Glastonbury, Conn., assignors to United Aircraft Corporation, East Hartford, Conn., a corporation of Delaware Application June 17, 1948, Serial No. 33,468

10 Claims. (Cl. 123—195)

This invention relates to a supercharger arrangement for aircraft engines and particularly to an arrangement to converting an engine from a single stage of supercharge to two stages of supercharging.

It is advantageous in the production of a particular engine model to be able to convert with as little modification as possible from a single stage of supercharging suitable for certain installations to two stages of supercharging for other installations having different requirements. A feature of the invention is a power plant construction by which conversion from one to two stages of supercharging can be accomplished with a minimum of replacement parts.

Another feature is the arrangement of the rear crankcase section of an engine so that it may be used with both a single-stage engine and a two-stage engine. One feature is the provision of side plates on the crankcase section which may be removed and replaced by the auxiliary superchargers and their drives. Another feature is the arrangement of a variable speed drive for the superchargers which is removable with the supercharger impellers.

Since the two stage engines may be used in a number of installations, a feature of the invention is the arrangement of the discharge conduits of the superchargers so that they may extend outwardly from the supercharger at any angle without modification of the power plant structure. Another feature is the interchangeability of the opposite superchargers and housings for the auxiliary supercharger stage to permit a further variation of the direction of discharge of air from the superchargers.

One feature of the invention is an arrangement of the parallel supercharger wheels of an auxiliary stage of supercharging with a common drive from the engine for both the main stage and the auxiliary stage. Another feature is the arrangement of "sidewheeler" superchargers operating in parallel to reduce the size of impeller required for delivering the necessary mass of air.

Another feature is the arrangement of the auxiliary superchargers as side-wheelers with the auxiliary superchargers and the main supercharger all driven from a single centrally located driving gear. One feature is the provision for driving the auxiliary impellers at variable speeds from an accessory shaft located at right angles to the impeller shaft.

Other objects and advantages will be apparent from the specification and claims, and from the accompanying drawings which illustrate an embodiment of the invention.

Figures 1, 3, 4:
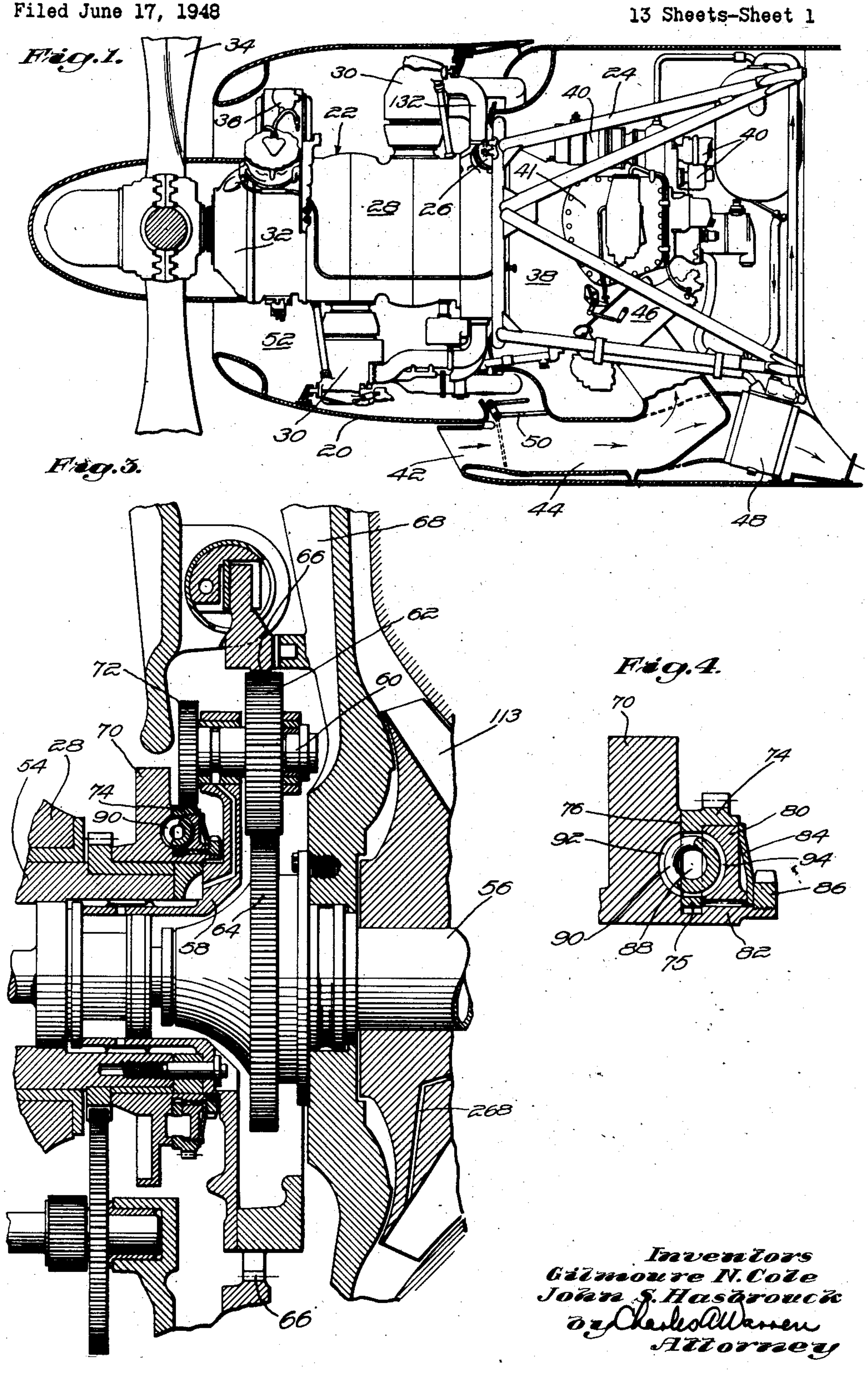
Fig. 1 is a sectional view through an airplane nacelle showing an installation of the engine using a single stage supercharger.
Fig. 3 is a sectional view on a larger scale than Fig. 2 showing the drive for the accessory shaft and for the secondary counterbalance.
Fig. 4 is a fragmentary sectional view of a part of the secondary counterbalance drive.

Referring first to Fig. 1, showing an engine with a single-stage of supercharge, the airplane nacelle 20 encloses an aircraft engine 22, supported as by a frame 24, the engine being connected to the frame as by mounting brackets 26. The engine shown is of the multiple-row radial type in which the crankcase 28 supports the cylinders 30 and has a nose section 32 incorporating the reduction gear, not shown, for the propeller system 34. The nose section also carries one or more accessories 36.

The crankcase 28 has a rear section 38 within which is enclosed the main supercharger and its drive together with a drive for other accessories 40, as will be hereinafter described in detail. The rear section has removable cover plates 41 on opposite sides thereof, to provide for conversion to a two-stage engine, as will appear later.

The nacelle has an air inlet 42 connected by a duct 44 to the carburetor 46. Air from this inlet may also be directed through an oil cooler 48. A flap 50 may be provided for closing the air inlet 42 and for opening the cooling air path 52, which surround the engine cylinders, to the duct 44.

Figure 2:
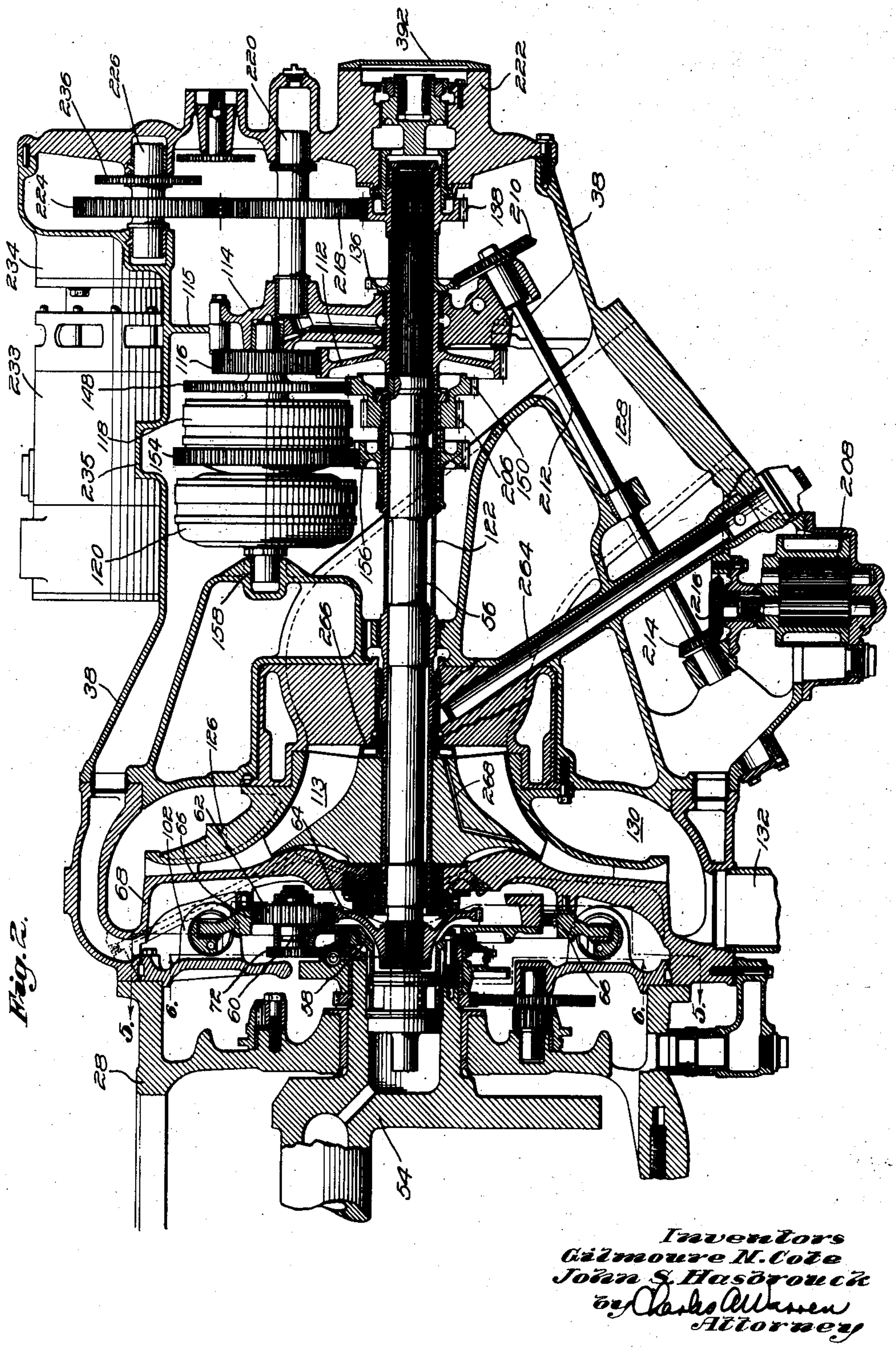
Fig. 2 is a longitudinal sectional view through the rear section of the engine of Fig. 1.

As shown in Figs. 2 and 3, the engine crankshaft 54 journalled in the crankcase 28 is arranged to drive an accessory shaft 56 through a change-speed gearing such that the accessory shaft will rotate substantially faster than the crankshaft and preferably at a speed three times that of the crankshaft. To accomplish this, the end of the crankshaft has mounted thereon a cage 58, Fig. 3, which supports the shafts 60 of a series of planet gears 62 (see Figs. 5 and 6), meshing with a sun gear 64 splined to the accessory shaft. The gears 62 also mesh with a ring gear 66 which is supported against rotative movement within a blower case or a housing 68 mounted on the end of the crankcase 28 and extending between the main crankcase 28 and the rear section 38. In this way, the accessory shaft 56 is driven at a speed greater than that of the crankshaft and at a selected speed determined by the sizes of the gears 62 and 64.

The drive mechanism, above described, also drives the secondary counterbalance 70, which is journalled in the crankcase, being rotatably mounted on the crankshaft. Certain of the shafts 60 carried by the cage support, in addition to the gear 62, another gear 72 meshing with a sun gear 74 connected to the counterbalance. By selecting the proper sizes of gears 72 and 74, the desired ratio of speeds between the counterbalance and the crankshaft may be obtained; in the arrangement shown, the counterbalance rotates at twice the speed of the crankshaft.

Gear 74 has an inwardly projecting flange 75, Fig. 4, located between a surface 76 on the counterbalance 70 and a ring 80 splined to a hub 82 integral with the secondary counterbalance. A spring 84, engaging with the side of the ring 80 and held in position by a clamping nut 86, urges the ring 80 against the flange 75 and holds the flange 75 against the surface 76 on the counterbalance, thus frictionally damping the relative motion between the flange 75 and the counterbalance. Flange 75 has slots 88, Fig. 6, to receive short springs 90, which, as shown in Fig. 4, extend into the recesses 92 and 94 in the secondary counterbalance and in the ring 80 respectively. These springs form a resilient drive between the flange 75 and the secondary counterbalance to absorb torsional pulsations in the drive from the crankshaft.

Figure 5:
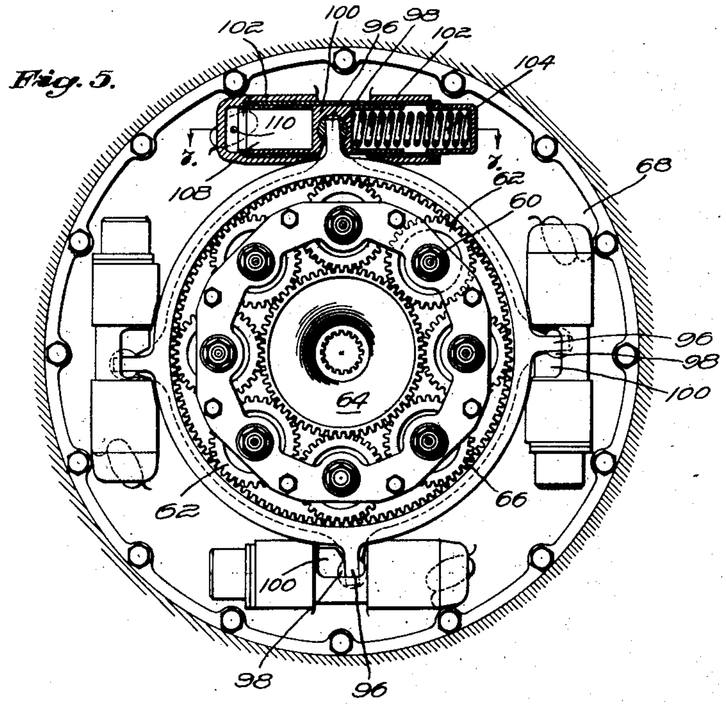
Fig. 5 is a sectional view substantially on the line 5—5 of Fig. 2.

Although the ring gear 66 is supported against rotation, it is, however, resiliently supported circumferentially for the purpose of damping vibrations or pulsations in the driving mechanism. For this purpose, the ring 66, as shown in Fig. 5, has outwardly projecting lugs 96, each carrying a spherical element 98 fitting in recesses in a plunger 100 slidable in guides 102 carried by a part of the blower case 68, Fig. 2. A coil spring 104 normally urges the plunger in such a direction as to urge the ring in a counterclockwise direction, Fig. 5.

Figures 7, 18:
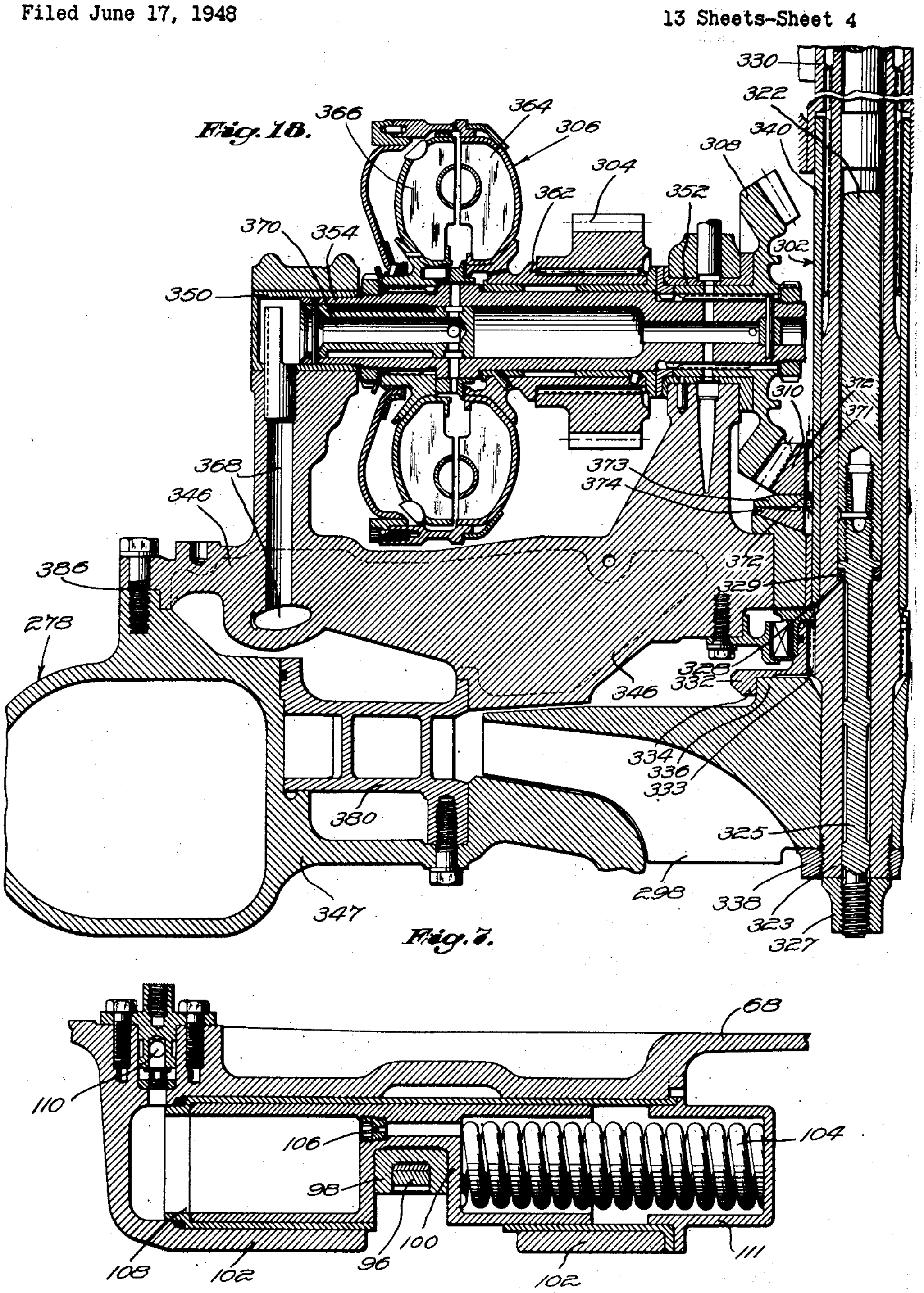
Fig. 7 (Sheet 12) is a sectional view substantially along the line 7—7 of Fig. 5.
Fig. 18 is a fragmentary sectional view on a larger scale of the low-ratio drive of Fig. 17.

The plunger 100 may form a part of a dashpot mechanism for further damping the motion of the ring. As shown in Fig. 7, the plunger 100 has a restricted orifice 106, which allows fluid to flow at a restricted rate from one end of the cylinder 108, which is supported by the guides 102 and surrounds the plunger. The necessary supply of fluid will be retained within the cylinder through an inlet passage 110 connected to a suitable source of fluid. One end of the cylinder 108 is closed by a part of one of the guides 102; the other end is closed by a cap 111 which also encloses spring 104. The speed increasing mechanism and the counterbalance drive are claimed in a copending Hasbrouck application Serial No. 33,515, filed June 17, 1948, now Patent No. 2,595,942.

With reference now to Figs. 2 and 3, the accessory shaft 56, driven by the gear 64 which is splined to it, carries a driving gear 112 for the supercharger impeller 113. In the arrangement shown, gear 112 is splined to the shaft 56 and forms a bearing surface for the shaft within a bracket 114 bolted to a web 115 in the rear section 38. From the gear 112 the drive is selectively through a gear 116 to a low ratio coupling 118 or to an intermediate ratio coupling 120 and thence to a sleeve 122 surrounding the shaft 56 and carrying adjacent to its forward end the supercharger impeller 113.

This impeller is located in the usual way within the blower case 68 and is surrounded by the diffuser disc 126, the latter being suitably connected to the blower case. Air enters through an inlet passage 128 from the carburetor 46, Fig. 1, and is delivered by the impeller into a chamber 130. From this chamber, the air under pressure reaches the individual engine cylinders through a series of intake pipes 132 connected to the blower casing and communicating, as will be apparent, with the inlet ports in the several engine cylinders. It may be noted that the inlet passage 128 is arranged at an acute angle to the axis of the impeller to minimize the change in direction of the air as it enters the impeller.

Figure 8:
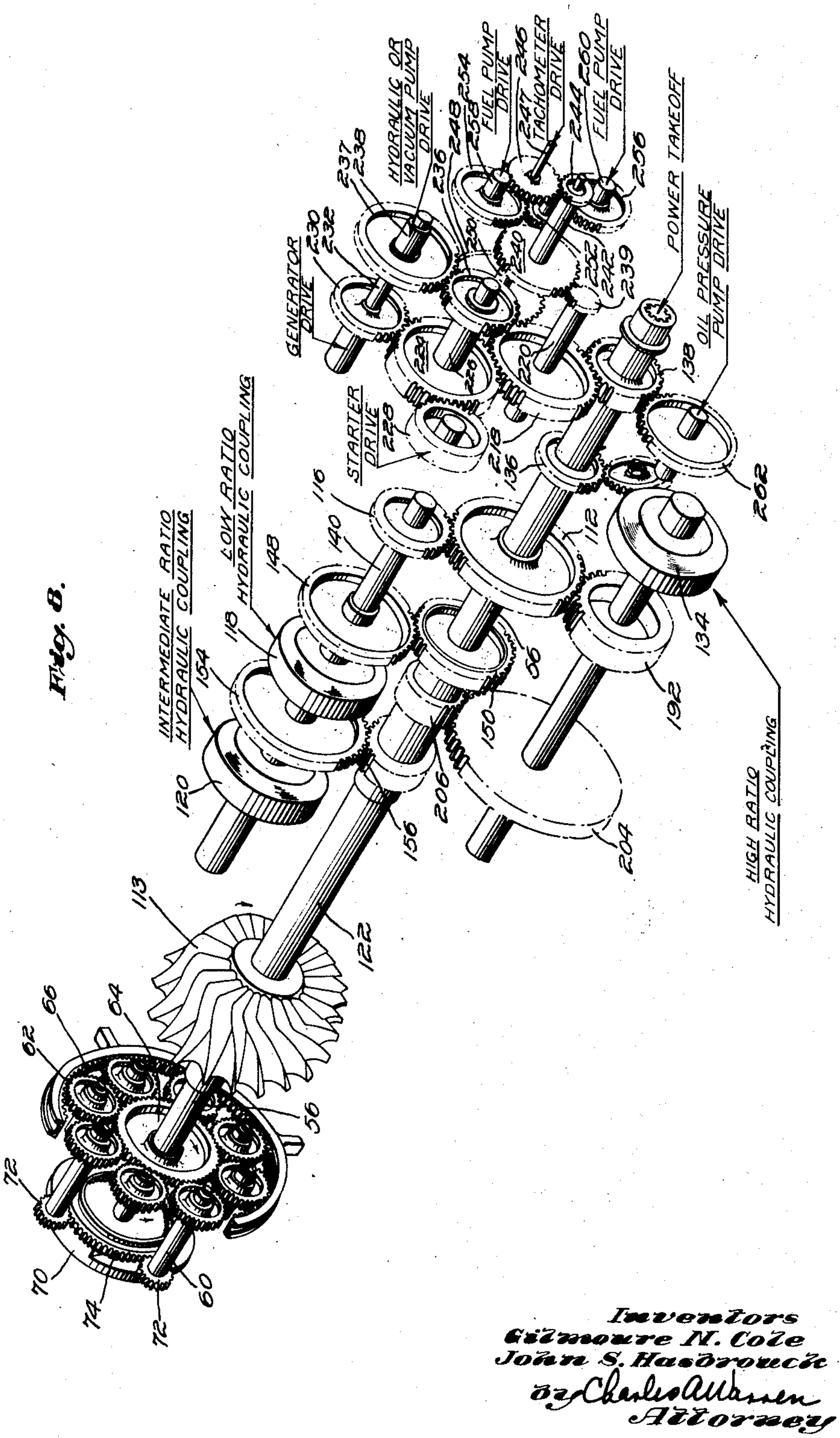
Fig. 8 is a diagrammatic view in perspective of the accessory and supercharger drive mechanism.

In addition to the low ratio coupling 118 and the intermediate ratio coupling 120, the supercharger may also be driven, as shown in Fig. 8, by a high ratio coupling 134. In each case, the drive is directly from the gear 112 on the accessory shaft. This shaft also functions to drive a number of accessories through other gears 136 and 138, as will hereinafter appear.

Figures 9, 10:
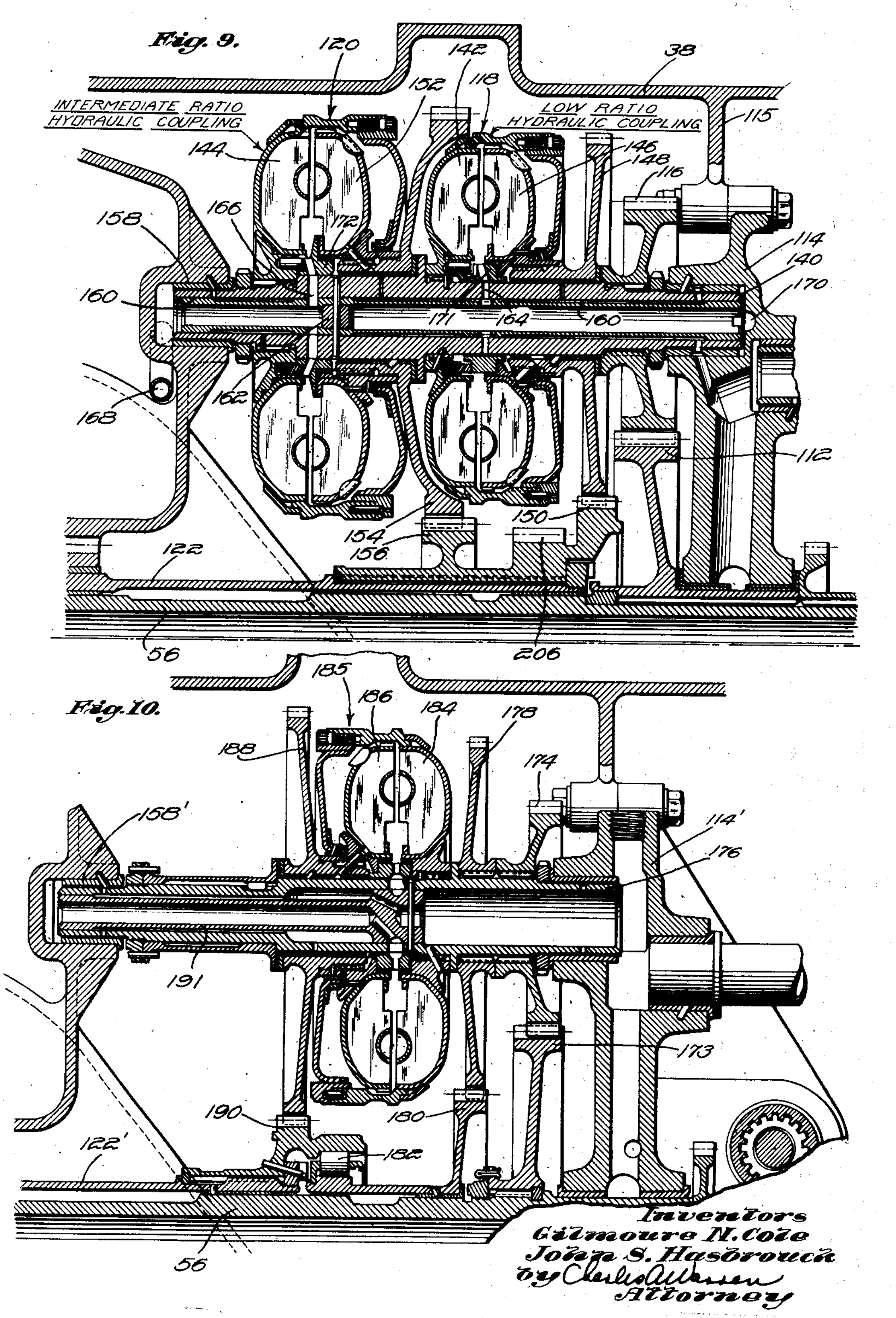
Fig. 9 is a sectional view through the low and intermediate ratio drives for the supercharger.
Fig. 10 is a view similar to Fig. 9 but showing a modification of the low and intermediate drives.

With reference to Fig. 9, which shows the low and intermediate ratio couplings, the gear 116 is splined to a jack shaft 140 to which is also splined the impeller 142 of the low ratio coupling and the impeller 144 of the intermediate coupling. The runner 146 of the low ratio coupling is splined to the hub of a gear 148 meshing with a cooperating gear 150 on the sleeve 122. Similarly, the runner 152 of the intermediate ratio coupling is splined to the hub of a gear 154 meshing with a gear 156 on the sleeve 122. In the arrangement shown, the gears 150 and 156 are integral and are splined to the sleeve. It will be apparent that, by selectively admitting fluid to either the low or intermediate ratio couplings, the rate of rotation of the supercharger impeller 113 may be controlled.

As one means of introducing fluid selectively to the couplings, the shaft 140, which is journalled in the bracket 114 and in a bearing 158 provided by the rear case 38 may be hollow to receive a sleeve 160 having a plug 162 between the inlet 164 to the low ratio coupling and the inlet 166 to the intermediate coupling. Fluid admitted into the closed end of the bearing recess 158, as through pipe 168, may enter the intermediate ratio coupling. Fluid admitted into the recess 170 in the bracket 114 is journalled, may flow through the sleeve 160 to the inlet to the low ratio coupling. Automatic control valves 171 and 172 for the couplings provide for cutting off the flow to the coupling when the runner overspeeds the impeller.

Instead of the two separate couplings for the low and intermediate drives, it may be advantageous to utilize the modified construction of Fig. 10 in which the shaft 56 carries a gear 173 comparable to the gear 112. This gear is in mesh with a gear 174 on an intermediate shaft 176 journalled as is the shaft 140 in a bracket 114′ and in a bearing 158′ provided by the rear case. Shaft 176 carries a gear 178 in mesh with a gear 180 arranged to drive the sleeve 122′ through an overrunning clutch 182, this drive constituting the low ratio drive for the supercharger impeller.

Also secured to the shaft 176 is the impeller 184 of a fluid coupling 185, the runner 186 of which is secured to the hub of a gear 188. Gear 188 meshes with a gear 190 which is splined to sleeve 122′ and the hub of which forms a part of the overrunning clutch 182. Thus, if fluid is introduced into the coupling, as through the sleeve 191 within the shaft 176, it will drive the gear 190 at a higher rate than the drive through the overrunning clutch so that the clutch begins to overrun and the supercharger impeller is then driven at the higher speed provided by the gear 188. This arrangement permits the elimination of one of the hydraulic couplings where it appears to be advantageous.

Figure 11:
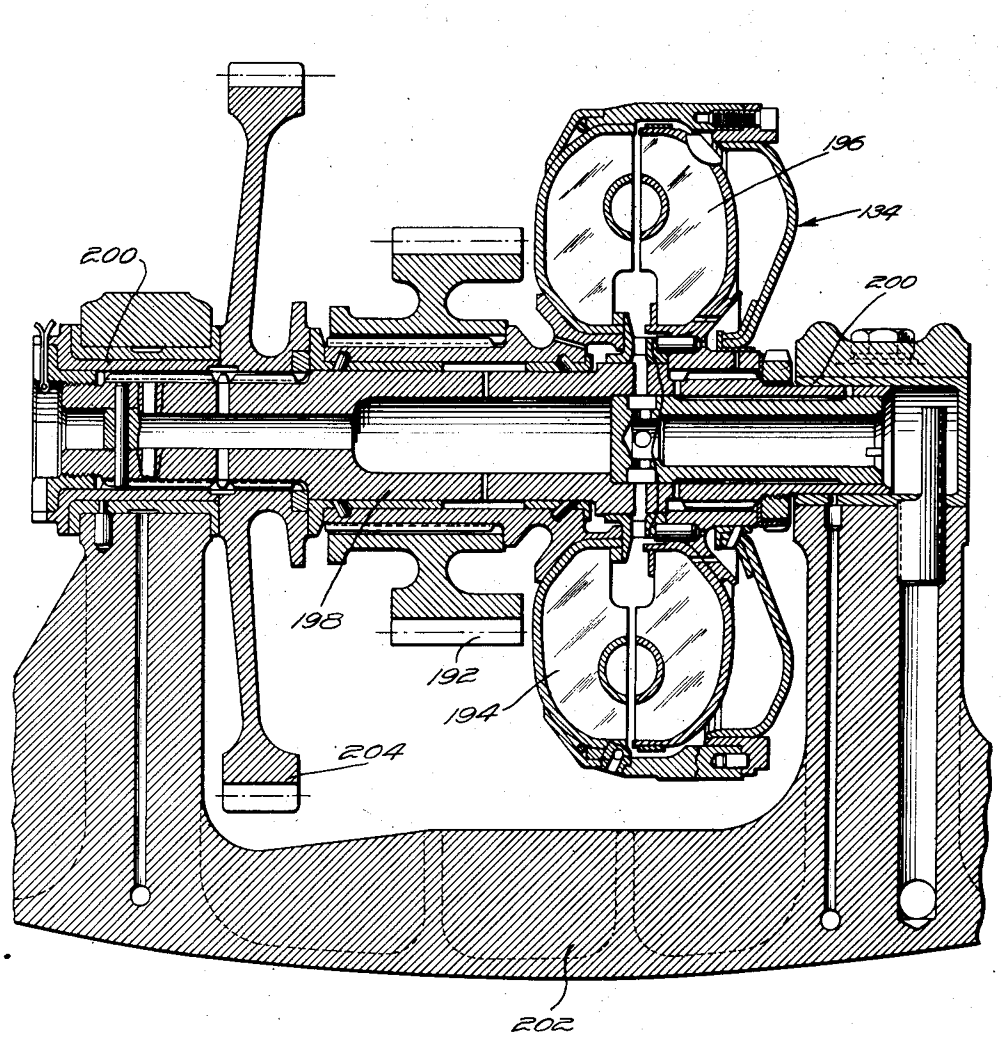
Fig. 11 is a view similar to Fig. 9 showing the high speed drive for the supercharger.

As above stated, the impeller 113 may be driven at even higher speeds by the high ratio coupling 134 which supplements either of the low and intermediate ratios above described. To this end, the gear 112 meshes with a gear 192, connected, as shown in Fig. 11, to the impeller 194, of the coupling 134. The runner 196 is mounted on a shaft 198 journalled in bearings 200 provided by a cap 202 mounted on the side of the rear case. The shaft 198 has secured to it a gear 204 meshing with a gear 206 through which the supercharger impeller is driven. The gear 206 may be a part of the gear structure which includes gears 150 and 156. Cap 202 may replace one of the side plates 41.

Figure 6:
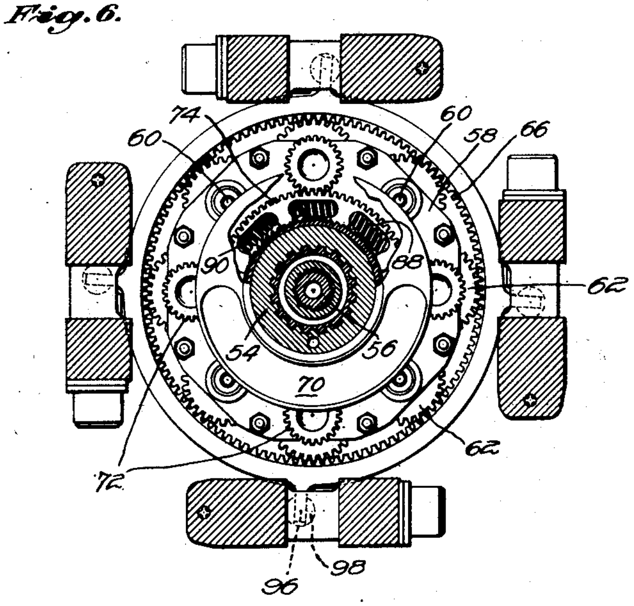
Fig. 6 is a sectional view substantially along the line 6—6 of Fig. 2.

Referring now to Figs. 2 and 6, the accessory shaft 56 also drives a number of accessories, such as the scavenge pump 208 through the gear 136 and a cooperating bevel gear 210. The latter gear is mounted on a shaft 212 journalled in the rear case and in the bracket 114 and extending downwardly at an angle to the accessory shaft 56. Adjacent the lower end, the shaft 212 carries a bevel pinion 214 meshing with a cooperating pinion 216 on one of the shafts on the scavenge pump. By this arrangement it is possible to locate the scavenge pump adjacent to the lowermost part of the rear case.

Other accessories are driven through the gear 138 on the accessory shaft and through a cooperating gear 218 on a jack shaft 220 journalled in a cover plate 222 attached centrally at the back of the rear case and in bracket 114. From the gear 218 the drive may be through an intermediate gear 224 on a jack shaft 226 journalled in the rear case and in the cap 222 and meshing with a cooperating gear 228, Fig. 8, which may be connected, for example, to the starter. The gear 224 may also mesh with a gear 230, Fig. 8, journalled on a shaft 232 and connected, for example, to a generator 233, Fig. 2.

Instead of the customary cantilevering of the accessories on a part of the crankcase, with resulting severe vibrations, certain of the accessories, such as the starter and generator, as shown in Fig. 2, are so mounted that they are supported for substantially their entire length. For example, the mounting boss 234 to which generator 233 is attached, faces forwardly of the rear crankcase section so that the generator extends along a part of the outer surface of the crankcase section 38 and is additionally supported by projecting lugs 235 integrally formed in the crankcase section.

Associated with the gear 224 on the shaft 226, Fig. 8, may be another gear 236 driving a gear 237 attached to a sleeve 238 journalled on the shaft 232. The sleeve may be connected, for example, to an hydraulic or vacuum pump, not shown.

The jack shaft 220 may also carry a pinion 239 meshing with a gear 240 on a jack shaft 242. From the shaft 242 the tachometer, not shown, may be driven through cooperating gears 244 and 246 on shaft 242 and the tachometer shaft 247, respectively. The gear 218 may also mesh with a gear 248 on a jack shaft 250 which carries a driving gear 252 for gears 254 and 256 on fuel pump shafts 258 and 260, respectively, through which fuel pumps may be driven. Other accessories may be driven from the gear 138, and, for example, by means of an intermeshing gear 262 through which, for example, an oil pressure pump may be driven.

It thus becomes apparent that the accessories are arranged to be driven as a group from the shaft 56 which, as above stated, is rotated at a speed higher than that of the crankshaft and preferably at the speed of the generator and starter. It will be pointed out hereinafter that the accessories are located in such a manner that an auxiliary supercharger stage may be added to the rear case 38 without interfering with the accessory drive. The particular accessory drive shown in Figs. 2 and 8 are illustrative of one arrangement of accessories and obviously, other arrangements may well be used as conditions require.

Referring again to Fig. 2, fuel may be supplied through a pipe 264 extending through a part of the rear case and arranged to deliver fuel to the spinner ring 266 located adjacent the inlet end of the supercharger impeller 113. For additional delivery of fuel, the impeller may be provided with one or more passages 268 for delivering fuel from the spinner 266 through the impeller to be discharged into the air flowing over the impeller adjacent its discharge end.

Figure 12:
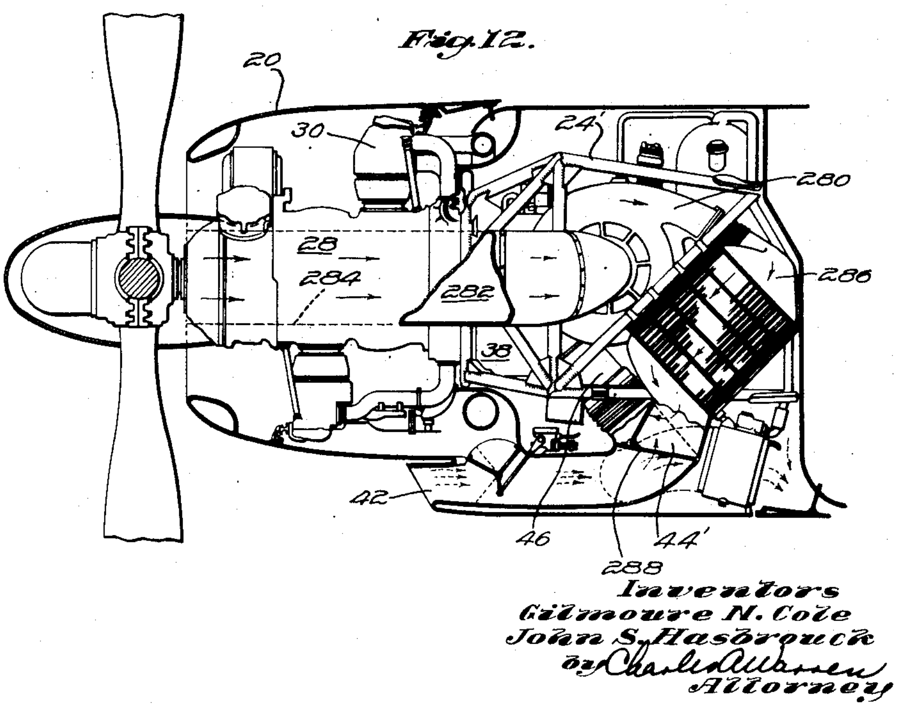
Fig. 12 is a view similar to Fig. 1 showing the engine installation with an auxiliary stage of supercharge.

The above-described engine is adapted to be converted from the single stage of supercharge, as above described, to an engine having two stages of supercharge without replacing the rear crankcase section 38. As shown in Fig. 12, the engine is basically the same as in Fig. 1, being of the multiple row radial type with the crankcase 28 supporting the cylinders 30 and being located within the cowling of an engine nacelle 20. The supporting frame 24′ is of somewhat different construction than that of Fig. 1, although its purpose is the same. The rear section 28, which encloses the main supercharger and its drive, supports on opposite sides the casings 278 and 280 for the impellers of the auxiliary supercharger stage. As will be pointed out in detail later, these casings are attached on opposite sides of the rear case on the openings 281, Figs. 16 and 19, normally closed by the cover plates 41, Fig. 1.

Air enters the auxiliary supercharger casings through ducts 282 and 284, Fig. 12, communicating with the centrally located inlet openings in the casings 278 and 280. Air compressed by the auxiliary compressor stages is discharged from the casings 278 and 280 into one or more intercoolers 286 and thence to the duct 44′ leading to the carburetor 46 and to the main supercharger. A flap valve 288 may be provided in the duct 44′ to close the discharge end of the intercoolers and to connect the main supercharger stage directly with the inlet 42.

Figure 14:
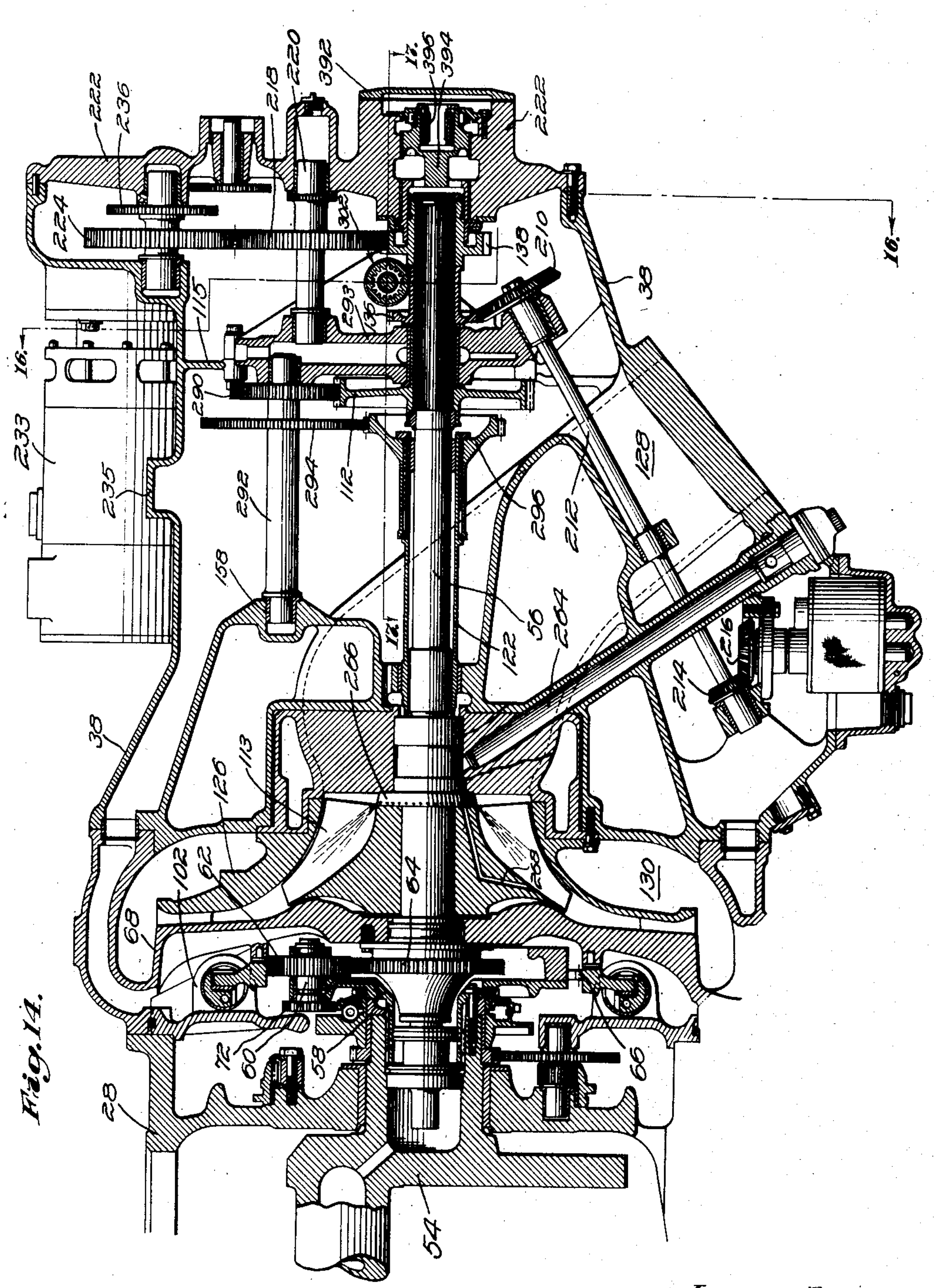
Fig. 14 is a view similar to Fig. 2 showing the arrangement of the parts for the two stage supercharger drive.

Referring now to Fig. 14, the main supercharger impeller 113 in the two-stage arrangement is driven from the accessory drive shaft 56 substantially in the manner above described with reference to Fig. 2. It will be noted, however, that instead of the variable speed drive utilizing fluid couplings, the gear 112 on the accessory shaft 56 meshes with a gear 290 on a jack shaft 292 journalled in a bracket 293 and in the bearing 158 in the rear case, and corresponding in general to the shaft 140. Shaft 292 carries a second gear 294 meshing directly with a gear 296 on the sleeve 122. Thus, the main supercharger impeller 113 rotates at a fixed ratio with respect to the engine speed. Bracket 293 replaces bracket 114 of the single-stage engine.

The accessory drive for the two-stage engine is unchanged from that of the main stage and includes the gear 218 meshing with the gear 138 on the accessory shaft 56. The description of the single-stage engine accessory drives will suffice.

Figure 15:
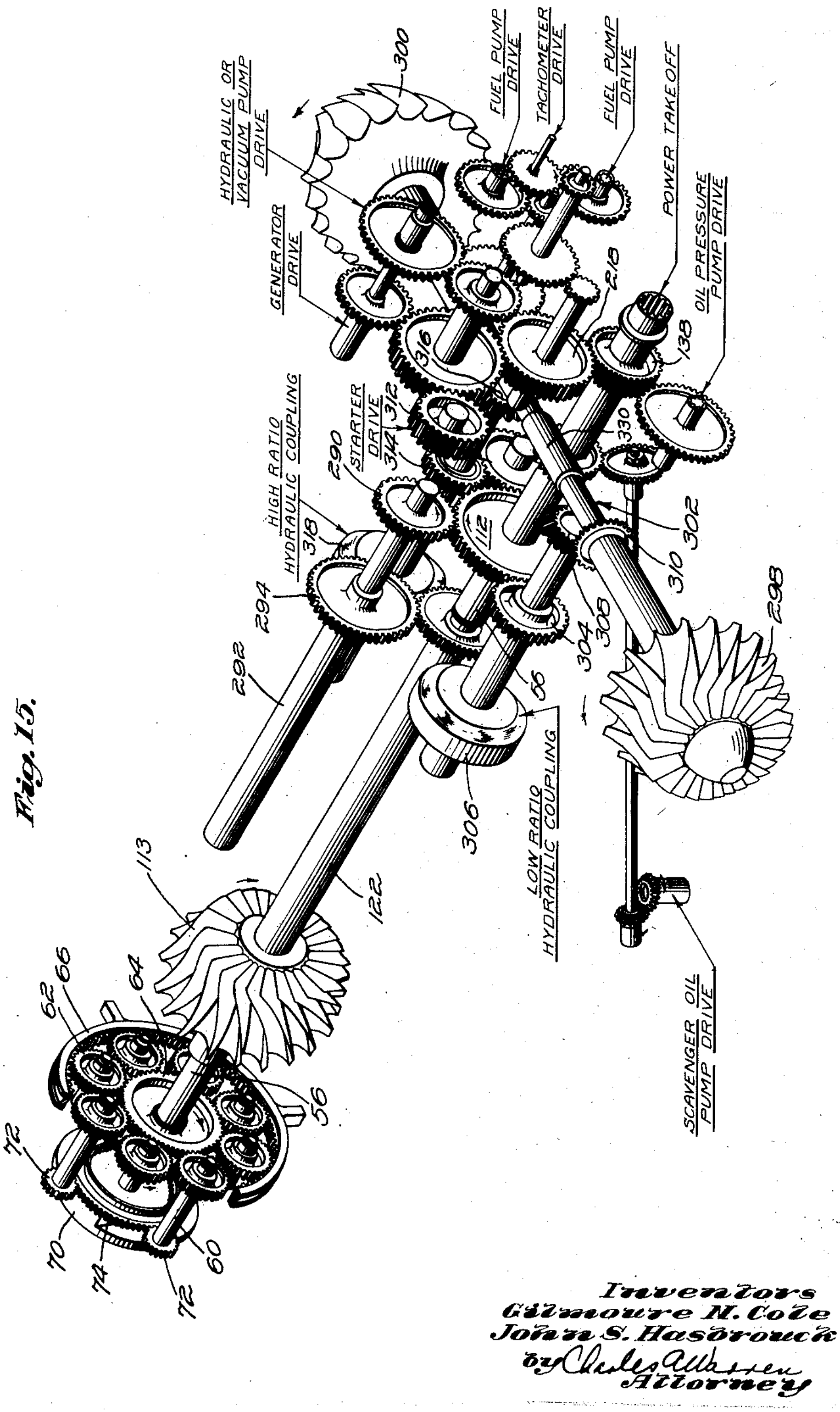
Fig. 15 is a perspective view of the drives of Fig. 14.

As shown in Fig. 15, the drive for the auxiliary stage impellers 298 and 300 is from the same gear 112 that drives the main-stage impeller. Thus, the impellers 298 and 300 are mounted at opposite ends of a shaft 302 driven in the low speed range through a gear 304 meshing with the gear 112 and a low-ratio hydraulic coupling 306 delivering power to a bevel gear 308 meshing with a gear 310 having a drive connection with the shaft 302. The auxiliary impellers are driven in the high speed range through a gear 312 meshing with the gear 112 and in turn driving a gear 314. The latter drives a bevel gear 316 through the high ratio coupling 318, the bevel gear 316 meshing with a cooperating bevel gear 320 (see also Fig. 17) connected to the impeller shaft 302.

Figure 16:
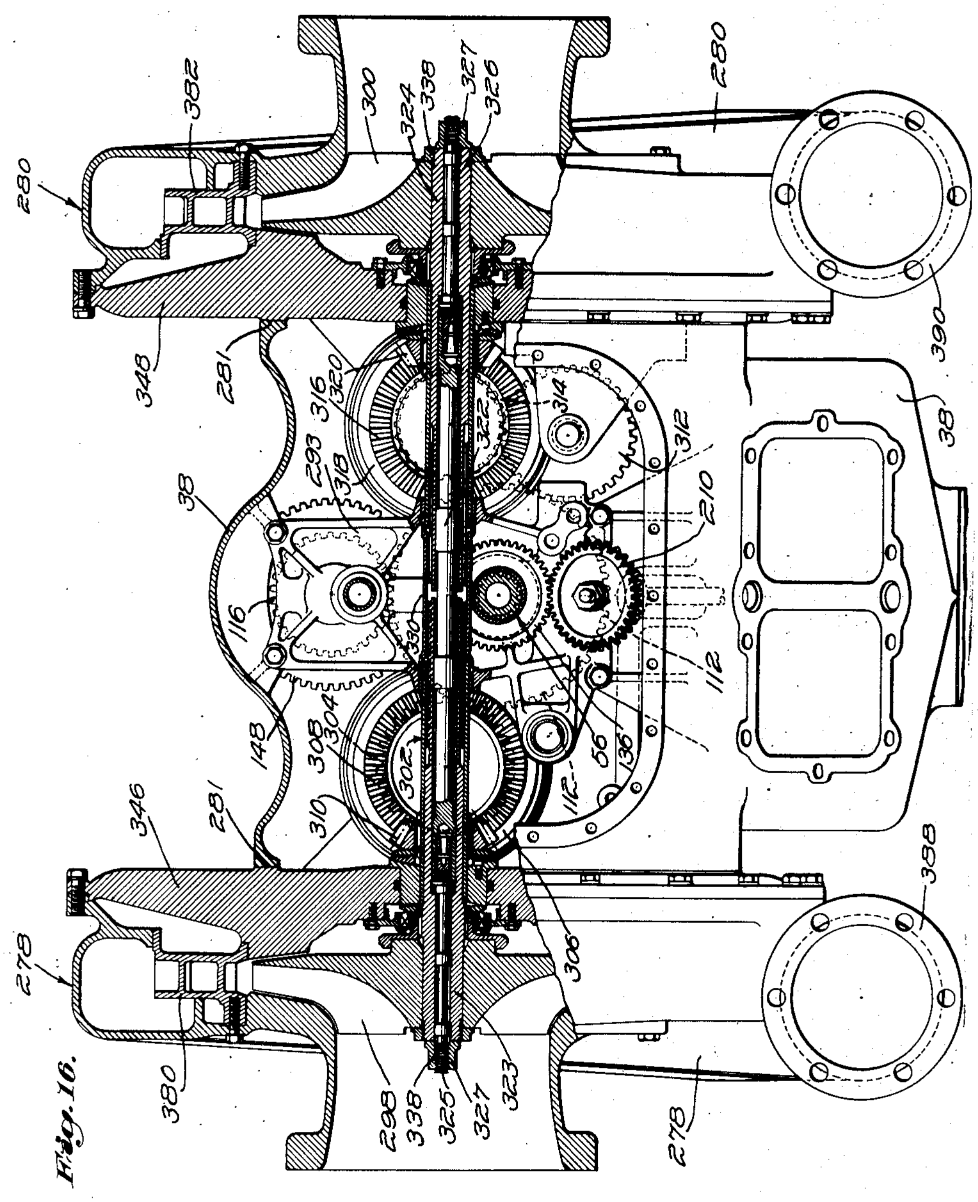
Fig. 16 is a sectional view substantially on the line 16—16 of Fig. 14.
Figure 17:
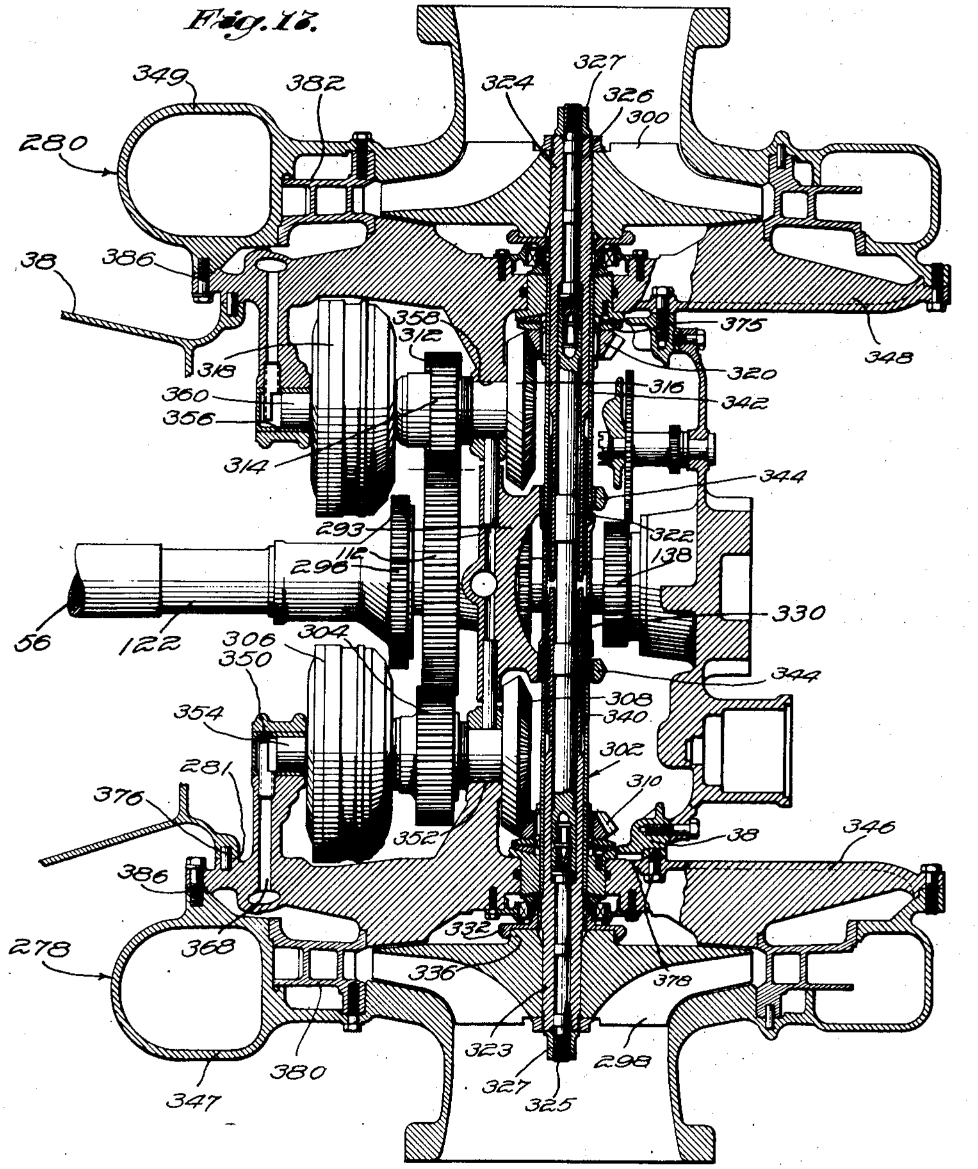
Fig. 17 is a sectional view substantially on the line 17—17 of Fig. 14.

With reference now to Figs. 16, 17, and 18, the impellers 298 and 300 in the casings 278 and 280 are interconnected by the shaft 302 in such a way as to balance the thrust on the impellers without interfering with the meshing of the bevel gears. The shaft 302 includes a connecting rod 322 on the opposite ends of which sleeves 323 and 324 are mounted, endwise movement of the sleeves being limited by bolts 325 and 326 threaded into the ends of the rod and forming extensions of the rod. The bolts have clamping nuts 327 at the outer ends by which the sleeves are clamped securely to the connecting rod 322. The sleeves 323 and 324 have internal shoulders 328 engaging spacing rings 329 at the ends of rod 322.

The inner ends of sleeves 323 and 324 are interconnected by a quill 330 splined to both sleeves in such a manner that the sleeves will be driven in unison and may move axially within the tube. The sleeves 323 and 324, and the interconnecting rod 322 and bolts 325 and 326 form with the quill 330 the assembled shaft 302 connecting the impellers.

Each of the sleeves 323 and 324 has a hub 332 mounted thereon and having a spline connection 333 with the associated sleeve. Each hub has an annular flange 334 receiving a central boss 336 on the adjacent impeller for driving the impeller. Each impeller is preferably a shrink fit on the sleeve, and a clamping nut 338 additionally locks each impeller in axial position on the supporting sleeve.

For driving the shaft 302, the sleeves 323 and 324 carry surrounding sleeves 340 and 342 respectively, splined to and axially slidable on the sleeves 323 and 324 and forming bearing surfaces for the assembled shaft. The assembled shaft 302 is journalled centrally in bearings 344 in the bracket 293 mounted, as above stated, in the rear crankcase section 38. Adjacent each impeller, the assembled shaft is journalled in plates 346 and 348, respectively, which form the back walls of the impeller casings 278 and 280. These plates 346 and 348, as shown in Figs. 16, 17, and 18, fit on opposite sides of crankcase section 38, replacing the plates 41 of Fig. 1. In addition to providing bearings for the assembled shaft, the plates form the back closure plates for the casings 278 and 280. The front plates for the casings are the scrolls 347 and 349 attached at their outer edges to the plates 346 and 348 respectively.

The plates 346 and 348 are arranged to support the driving mechanisms for the auxiliary supercharger stage. Thus, as best shown in Figs. 17 and 18, the plates 346 provides bearings 350 and 352 for the shaft 354 for the low ratio drive. The plate 348 provides similar bearings 356 and 358 for the shaft 360 of the high ratio drive. With this arrangement, it is apparent that the auxiliary supercharger stage may be added to the engine on the same rear crankcase section 38 without the necessity for any modification of the crankcase section.

The drive connections for the low and high ratio drives of the auxiliary supercharger stage are similar, except for the gear ratios, and a description of the low ratio drive will suffice. As shown in Fig. 18, the gear 304 is splined to a sleeve 362 on which the impeller 364 of the hydraulic coupling 306 is mounted. The runner 366 of the coupling is splined to the shaft 354 to which the bevel gear 308 is also splined. The supply of fluid to the coupling may be through a passage 368 in plate 346 and through a ported plug 370 in the shaft 354.

Also, as shown in Fig. 18, the gear 310 driven from the gear 308 has a spline connection 371 with the sleeve 340 and is held in fixed axial position thereon by locking rings 372. The gear 310 is backed up by a thrust bearing ring 373 which engages with a cooperating ring 374 supported by plate 346 for limiting the axial movement of the gear. Gear 320 is fastened to sleeve 342 in a similar manner and is backed up by a thrust bearing 375. The assembled shaft 302, however, is free to slide axially within the sleeves 340 and 342, thereby permitting the axial thrusts on the opposite impellers 298 and 300 to be balanced.

In mounting the auxiliary supercharges on the rear crankcase section, the plate 346 with the low ratio drive mounted thereon is placed in position on the side of the crankcase section 33, being located as by pins 376, and is then fastened in position as by bolts 378. Bracket 293 having previously been mounted in position, sleeve 340 will be in position with the gear 310 thereon meshing with gear 308. The plate 348 being similarly mounted, the shaft 362 is then assembled in position within sleeves 340 and 342 on the ends of which the impellers are mounted. Diffuser elements 380 and 382 are placed around the impellers and the outer scrolls 347 and 349 of casings 278 and 280 are bolted to the backing plates 346 and 348 as by bolts or studs 386.

Figures 19, 20:
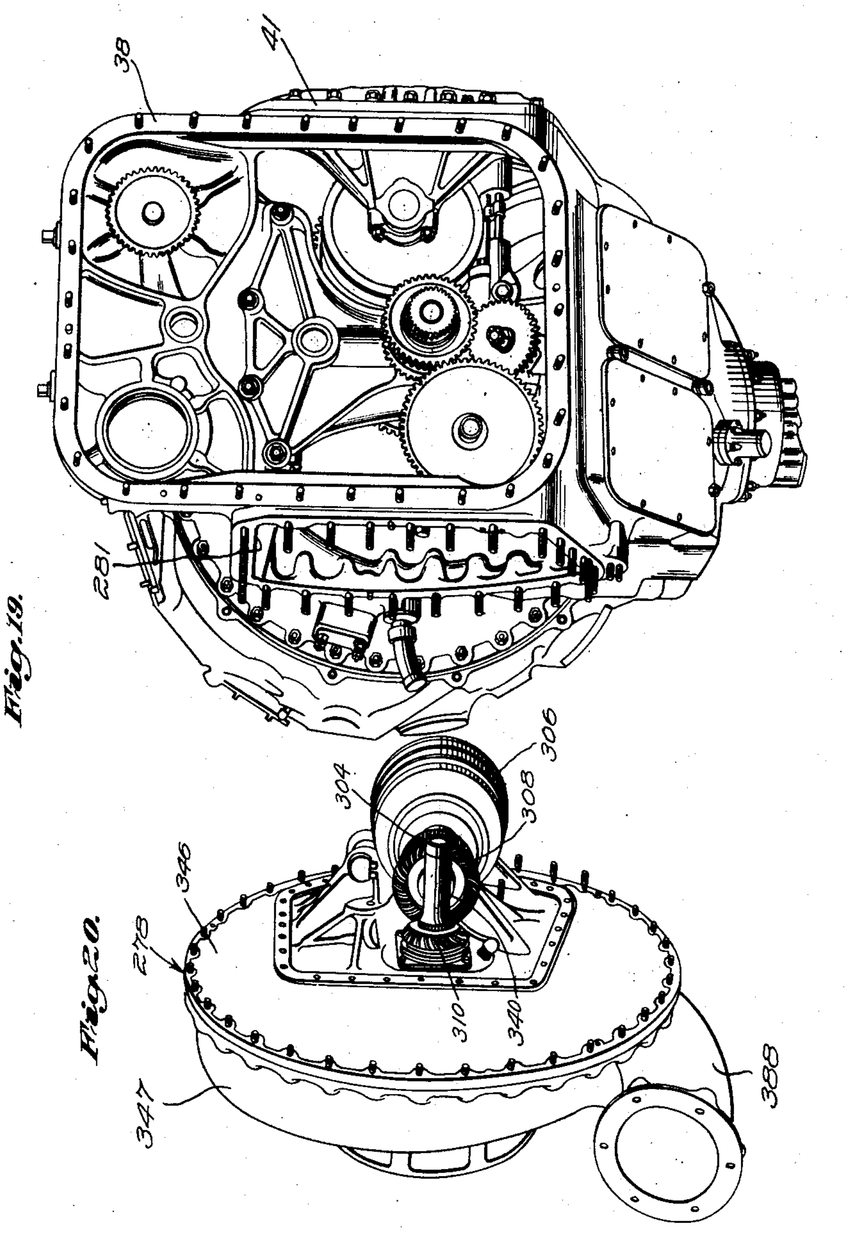
Fig. 19 is a perspective view showing the rear crankcase section with one side cover plate removed.
Fig. 20 is a view of one of the auxiliary stage supercharger casings showing the assembled drive.

Although the auxiliary supercharger and its drive is shown as a sub-assembly in Fig. 20, it will be understood that the showing is for the purpose of clarity and the assembly is not intended to be mounted as an assembled unit. The auxiliary superchargers are assembled on the rear crankcase section as above described, with plates 346 and 348 mounted on the side openings 281 provided in the rear crankcase section and covered, in the single stage engine, by the plates 41.

With the arrangement of auxiliary superchargers shown, it is possible to have the discharge conduits 388 and 390 on the supercharger casings 278 and 280 project substantially any angle in the plane of the casing by adjusting the angular position of the scrolls 347 and 349 on the backing plates 346 and 348. To accomplish this, the bolts 386 are evenly spaced around the periphery of the backing plate and the diffuser elements 380 and 382 which are piloted on backing plates 346 and 348 respectively, in turn pilot the scrolls 348 and 349 in any angular position.

Figure 13:
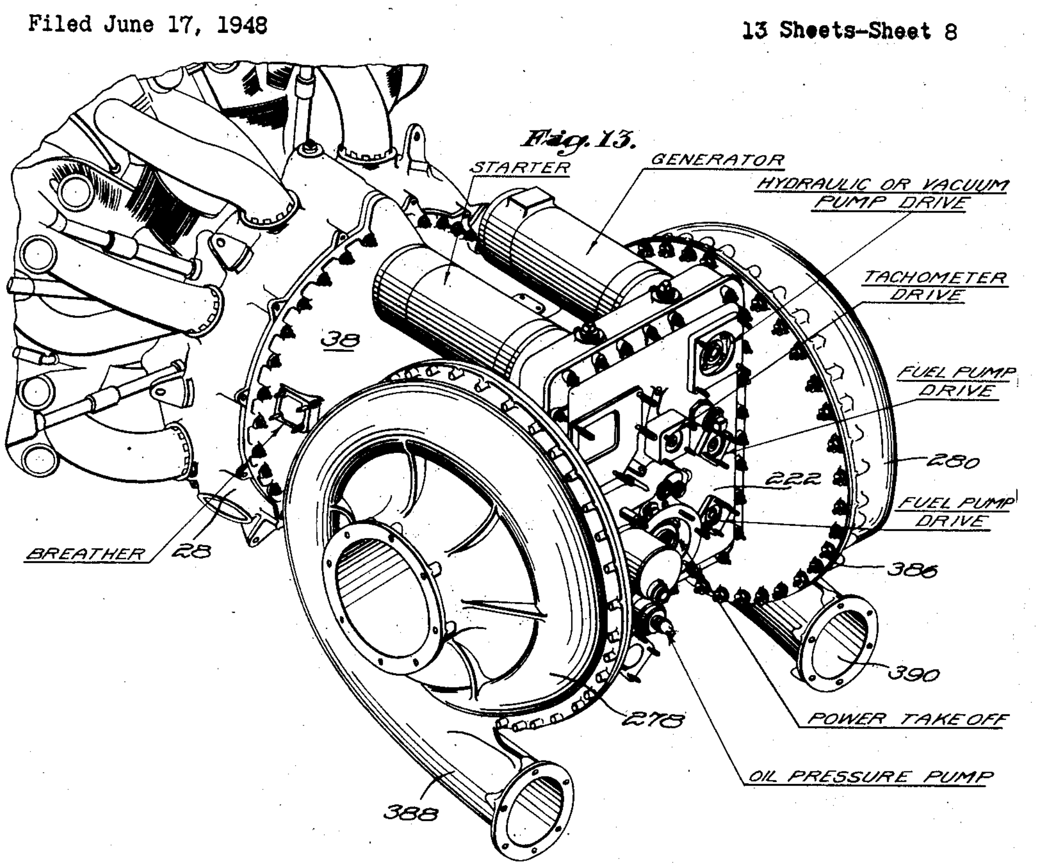
Fig. 13 is a perspective view showing the arrangement of the auxiliary supercharger stage.

Also by reversing the positions of scrolls 347 and 349, that is by mounting scroll 349 on backing plate 346, the tangential arrangement of the discharge conduits is reversed. Thus, as shown in Fig. 13, the impellers are rotating in such a direction that the air is moving counterclockwise and is discharged tangentially, whereas, in Fig. 12, the air, when the engine is viewed from the same side, is moving clockwise and is accordingly discharged from the scroll in substantially the opposite tangential direction. Reversal of the scrolls necessitates reversal of the direction of impeller rotation, which can be readily done, as will be apparent.

Since the main impeller 113 and the auxiliary impellers 298 and 300 are all driven from the gear 112 which, being mounted on the accessory shaft, is driven faster than the crankshaft through the step-up gearing connecting the crankshaft and accessory shaft, the required step-up gearing at the impellers is minimized and the single step-up gear between the crankshaft and the accessory shaft serves for all the impellers.

The other accessory drives are, as above stated, the same in both the single and two stage engines and no revisions of the accessory drive is necessary in replacing the single stage of supercharging by the two stage. It will be apparent that, in addition to the accessories above described, the rear plates 222 may have a small removable cap 392 which covers a power take off connected to the accessory shaft. As shown in Fig. 14, a coupling 394, which is splined to the end of the accessory shaft or to the hub of gear 138 and forms a bearing for the outer end of the accessory shaft, may carry internal splines 396 which will permit the attachment thereto of a unit adapted to be driven from the accessory shaft.

It is thus apparent that, with a minimum of parts it becomes possible to convert from the single stage engine to a two stage engine. The removal of one of the cover plates 41, Fig. 1, removes with it the high ratio drive for the main supercharger impeller. These plates are replaced by the plates 346 and 348, and the parts associated therewith, and make the engine a two stage unit. It will be understood that the particular controls by which the several ratios for the two stage supercharger is obtained is not a feature of the invention. The invention is directed to the structural arrangement of the engine by which to obtain the results above set forth.

It is to be understood that the invention is not limited to the specific embodiment herein illustrated and described, but may be used in other ways without departure from its spirit as defined by the following claims.

We claim:

1. In an engine, a crankcase section, a power shaft longitudinally therein, opposed openings on opposite sides of the crank case, cover plates on said openings, a rear plate on said section, accessories on said rear plate, connections from said shaft to said accessories, a main stage supercharger impeller in said crankcase section, and a drive from said shaft to said impeller including a gear on said shaft, in combination with opposed auxiliary stage superchargers arranged to be mounted on said opposed openings in place of said cover plates, each supercharger including an impeller and a mounting plate connected to the crankcase section and covering said opening and driving means for said auxiliary stage superchargers mounted on each of said mounting plates and having gears meshing with said gear on said shaft.

2. In an engine, a crankcase section, a power shaft longitudinally therein, opposed openings on opposite sides of the crankcase, cover plates on said openings, a rear plate on said section, accessories on said rear plate, connections from said shaft to said accessories, a main stage supercharger impeller in said crankcase section, and a drive from said shaft to said impeller including a gear on said shaft, in combination with opposed auxiliary stage superchargers arranged to be mounted on said opposed openings in place of said cover plates, each supercharger including an impeller and a mounting plate connected to the crankcase section and covering said opening, driving means for said auxiliary stage superchargers mounted on each of said mounting plates and having gears meshing with said gear on said shaft, each of said driving means including an hydraulic coupling, and a drive connection between the opposed supercharger impellers whereby both impellers may be driven by either of the driving means.

3. In an engine, a crankcase section, a power shaft longitudinally therein, opposed openings on opposite sides of the crankcase adapted to be covered by cover plates, a rear plate on said section, accessories on said rear plate, connections from said shaft to said accessories, a main stage supercharger impeller in said crankcase section driven from said power shaft, and opposed superchargers mounted on said opposed openings.

4. In an engine, a crankcase section, a power shaft longitudinally therein, opposed openings on opposite sides of the crankcase adapted to be covered by cover plates, a rear plate on said section, accessories on said rear plate, connections from said shaft to said accessories, a main stage supercharger impeller in said crankcase section driven from said power shaft, and opposed superchargers mounted on said opposed openings, each supercharger including a mounting plate to cover said openings.

5. In an engine, a crankcase section, a power shaft longitudinally therein, opposed openings on opposite sides of the crankcase adapted to be covered by cover plates, a rear plate on said section, accessories on said rear plate, connections from said shaft to said accessories, a main stage supercharger impeller in said crankcase section driven from said power shaft, and opposed superchargers mounted on said opposed openings, each supercharger including a mounting plate to cover said openings, an impeller for each supercharger and a shaft transversely positioned in said crankcase section and interconnecting said impellers.

6. In an engine, a crankcase section, a power shaft therein, opposed openings on sides of the crankcase, a rear plate on said section, accessories on said rear plate, connections from said to said accessories, a main stage supercharger impeller in said crankcase section, a drive from said shaft to said impeller, and opposed auxiliary stage superchargers mounted on said opposed openings, each supercharger including an impeller, a mounting plate connected to the crankcase section covering an opening and driving means for said auxiliary stage superchargers driven by said shaft.

7. In an engine, a crankcase section, a power shaft therein, opposed openings on sides of the crankcase, a rear plate on said section, accessories on said rear plate, connections from said shaft to said accessories, a main stage supercharger impeller in said crankcase section, a drive from said shaft to said impeller including a gear on said shaft, and opposed auxiliary stage superchargers mounted on said opposed openings, each supercharger including an impeller, a mounting plate connected to the crankcase section covering an opening and driving means for said auxiliary stage superchargers driven by said shaft and having gears meshing with said gear on said shaft.

8. In an engine, a crankcase section, a power shaft therein, opposed openings on sides of the crankcase, a rear plate on said section, accessories on said rear plate, connections from said shaft to said accessories, a main stage supercharger impeller in said crankcase section, a drive from said shaft to said impeller including a gear on said shaft, and opposed auxiliary stage superchargers mounted on said opposed openings, each supercharger including an impeller, a mounting plate connected to the crankcase section covering an opening and driving means for said auxiliary stage superchargers driven by said shaft and having gears meshing with said gear on said shaft, each of said driving means including a hydraulic coupling.

9. In an engine, a crankcase section, a power shaft therein, opposed openings on sides of the crankcase, a rear plate on said section, accessories on said rear plate, connections from said shaft to said accessories, a main stage supercharger impeller in said crankcase section, a drive from said shaft to said impeller including a gear on said shaft, and opposed auxiliary stage superchargers mounted on said opposed openings, each supercharger including an impeller, a mounting plate connected to the crankcase section covering an opening and driving means for said auxiliary stage superchargers driven by said shaft and having gears meshing with said gear on said shaft, each of said driving means including a hydraulic coupling, and a drive connection between the opposed supercharger impellers for driving both impellers by either of the driving means.

10. In an engine, a crankcase section having opposed lateral openings therein, cover plates arranged to cover said openings, and superchargers including an impeller, a shaft therefor, and a housing adapted to replace each of said cover plates, each housing covering one of said openings and being mounted on the crankcase section, a power shaft in said crankcase section having a first gear thereon, and means including a hydraulic coupling having driving and driven elements, a second gear associated with the driving element and adapted to mesh with said first gear, a bevel gear connected to said driven element and a cooperating bevel gear on said impeller shaft, said coupling, second gear, and bevel gears being mounted on the housing and arranged to be located within the crankcase section when the housing is in position thereon.

GILMOURE N. COLE.
JOHN S. HASBROUCK.

References Cited in the file of this patent

UNITED STATES PATENTS

| Number | Name | Date |
|---|---|---|
| 1,647,434 | Chorlton | Nov. 1, 1927 |
| 1,874,681 | Woolson | Aug. 30, 1932 |
| 1,998,778 | Gregg | Apr. 23, 1935 |
| 2,001,866 | Caminez | May 21, 1935 |
| 2,098,718 | Caminez et al. | Nov. 9, 1937 |
| 2,172,100 | Hoffman et al. | Sept. 5, 1939 |
| 2,238,889 | Kollmann | Apr. 22, 1941 |
| 2,346,032 | Kinnucan | Apr. 4, 1944 |
| 2,393,172 | Larrecq | Jan. 15, 1946 |
| 2,400,307 | Hobbs et al. | May 14, 1946 |

FOREIGN PATENTS

| Number | Country | Date |
|---|---|---|
| 399,133 | Germany | July 28, 1924 |
| 528,774 | Great Britain | Nov. 6, 1940 |